US012761792B2

(12) United States Patent
Uttarwar et al.

(10) Patent No.: US 12,761,792 B2
(45) Date of Patent: Oct. 13, 2026

(54) EFFICIENT SUB-BLOCK ERASING

(71) Applicant: Western Digital Technologies, Inc., San Jose, CA (US)

(72) Inventors: Sagar Uttarwar, Bangalore (IN); Disha Gundecha, Pune (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/878,490

(22) Filed: Aug. 1, 2022

(65) Prior Publication Data

US 2024/0036729 A1 Feb. 1, 2024

(51) Int. Cl.
*G06F 3/06* (2006.01)

(52) U.S. Cl.
CPC .............. *G06F 3/061* (2013.01); *G06F 3/064* (2013.01); *G06F 3/0652* (2013.01); *G06F 3/0679* (2013.01)

(58) Field of Classification Search
CPC ...... G06F 3/061; G06F 3/0679; G06F 3/0652; G06F 3/064
See application file for complete search history.

(56) References Cited

U.S. PATENT DOCUMENTS 8,688,948 B2 * 4/2014 Lordello ............. G06F 12/0292 711/202
9,036,428 B1 * 5/2015 D'Abreu ................ G11C 16/16 365/185.23
9,256,530 B2 2/2016 Oh et al.
9,436,595 B1 * 9/2016 Benitez ............... G06F 12/0246
9,466,384 B1 10/2016 Chang et al.
10,734,079 B1 8/2020 Seetharaman et al.
10,896,728 B2 1/2021 Kanamori et al.
2008/0219053 A1 * 9/2008 Kim ..................... G11C 16/349 365/185.11
2014/0310447 A1 * 10/2014 Chang ................ G11C 16/0483 711/103
2020/0409808 A1 12/2020 Seetharaman et al.

OTHER PUBLICATIONS

Chen, T. et al., "Enabling Sub-blocks Erase Management to Boost the Performance of 3D NAND Flash Memory", DAC '16, Jun. 5-9, 2016, http://dx.doi.org/10.1145/2897937.2898018.

* cited by examiner

*Primary Examiner* — Mark A Giardino, Jr.
(74) *Attorney, Agent, or Firm* — Rutan & Tucker LLP; Hani Z. Sayed; Ravi Mohan

(57) ABSTRACT

Storage devices contain a memory array that comprises memory devices for storing data. These memory devices can be arranged in a configuration of blocks that group a number of memory devices together. Often, blocks are the smallest unit that can be erased, however various storage devices can divide blocks into sub-blocks which can operate as unique blocks themselves. These sub-blocks can be seen as regular blocks to the storage device or host computer. However, the time needed to erase these increased number of operational sub-blocks decreases overall performance as more erase time is needed. Devices and methods described herein decrease overall erase times within a sub-block memory array by checking the status of related sub-blocks before processing an erase request for a particular sub-block. Each of the related sub-blocks can be erased alongside the particular sub-block if the status of the related sub-blocks provides for erasure without losing host data.

20 Claims, 6 Drawing Sheets

EFFICIENT SUB-BLOCK ERASING

FIELD

The present disclosure relates to storage systems. More particularly, the present disclosure relates to analyzing and dynamically managing erasing of sub-blocks within storage devices to decrease erasure times and improve overall performance.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

The memory devices configured to store data within SSDs typically are configured into a memory array. The memory array can be arranged into lines of memory devices that are grouped into pages. These pages may further be configured into blocks. In many storage devices, data can be written to the memory array in different proportions than can be erased. For example, in certain storage devices data can be written in units as small as word lines but can only erase data in units as small as blocks. This disproportionate writing and erasing of data can present usage issues within the storage device.

However, in some storage devices, blocks can be configured to operate as sub-blocks which can be erased in smaller units than a block. These sub-blocks can operate independently as unique blocks but exist within the same physical block within the memory array. As a result, when erase commands are issued to a sub-block, each sub-block is erased individually. While providing for smaller units of operation, this erasing of each sub-block increases the overall time needed to erase portions of the memory array. Depending on the types of erase and writing operations being performed, this increased erasure time can lead to performance issues.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
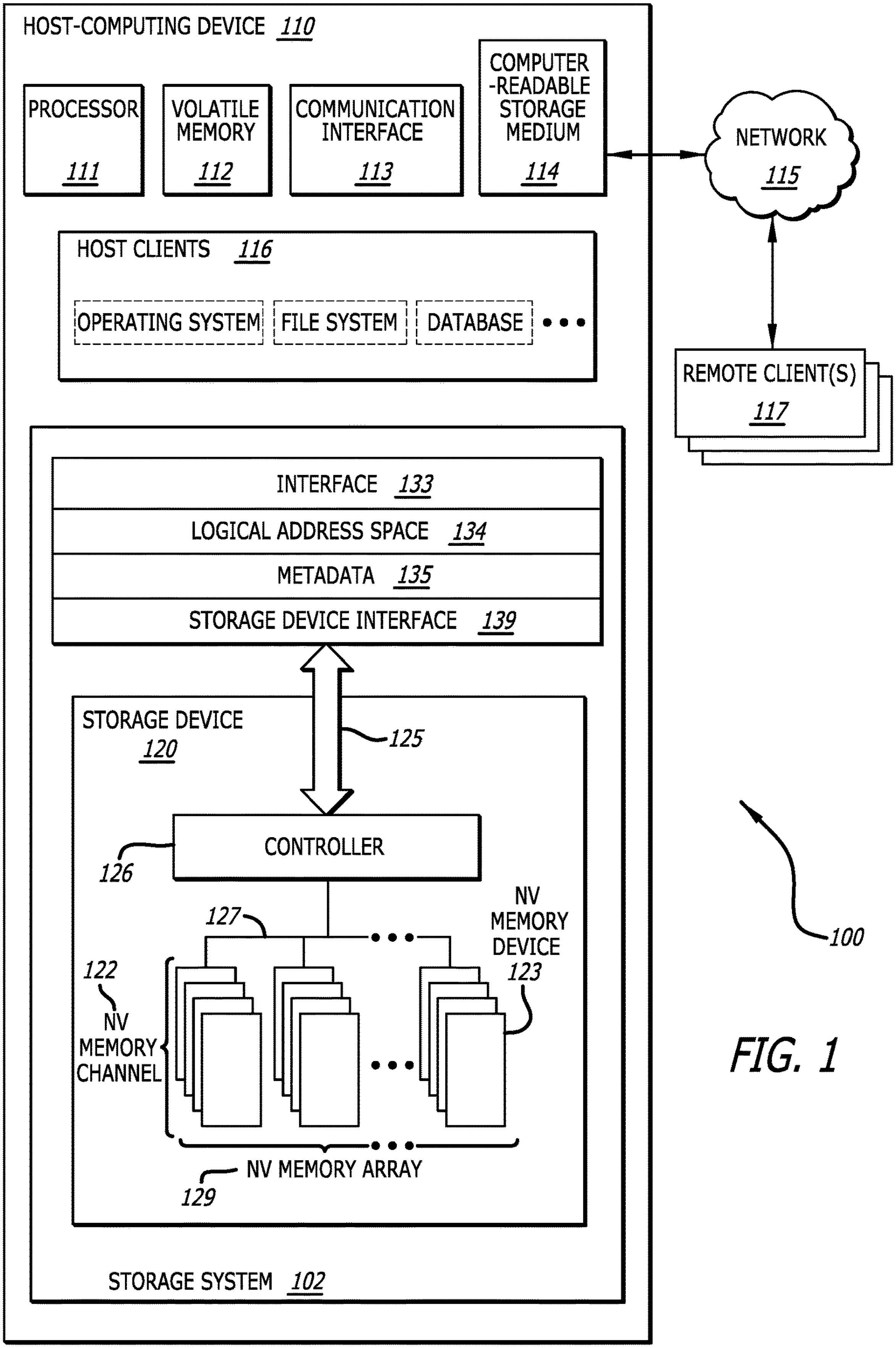
FIG. 1 is schematic block diagram of a host-computing device with a storage device suitable for sub-block management in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that efficiently erases sub-blocks during normal sub-block operations. More specifically, overall erase times for a memory array can be reduced if related sub-blocks are erased along with sub-blocks that are scheduled for erasure. By utilizing these methods, erasure times can lowered back toward non-sub-block levels.

During operation of a memory array, the storage device can be configured one or more of the blocks to operate as sub-blocks. These sub-blocks are partitioned into multiple units, which are often, but not necessarily, equal in size. When a block is configured into a sub-block, all of the resultant sub-blocks are related as part of the original block. Each of the related sub-blocks can subsequently be operated and recognized by the storage device as unique regular blocks. The sub-blocks can be erased individually, without the need to erase the entire original block, as in many traditional SSDs.

However, during particular use cases, the time needed to erase each sub-block within the memory array can increase proportionally to the number of sub-blocks created from each regular block. For example, a storage device that partitions each of the blocks within the memory array into two sub-blocks, faces a doubling of overall erase times. Likewise, a memory array that configures blocks into four sub-blocks will have the erase times increase by four times, etc.

In many embodiments, the status of related sub-blocks can be checked to see if they can also be erased when an erase command is received for a particular sub-block. For example, when a block is configured as a sub-block with two unique sub-blocks, when a first sub-block is marked for erasure (or allocation, release, etc.), then the status of the second sub-block can be checked before the erasure of the first sub-block. If the second sub-block is also marked as unallocated, released, etc., then both the first and second sub-block can be erased.

Likewise, these methods can be applied to memory device blocks that are sub-divided into a large number of sub-blocks. Each of the related sub-blocks can be checked for the current status and the original erasure command can be expanded to cover any of the available related sub-blocks within the original block. In this way, sub-block operation can be achieved without the full impact of increased erasure times. The related sub-blocks that are erased can have their status updated within the storage device controller such that when the next write and/or erase command is received, the erase step can be skipped.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for sub-block management in accordance with an embodiment of the disclosure is shown. The sub-block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
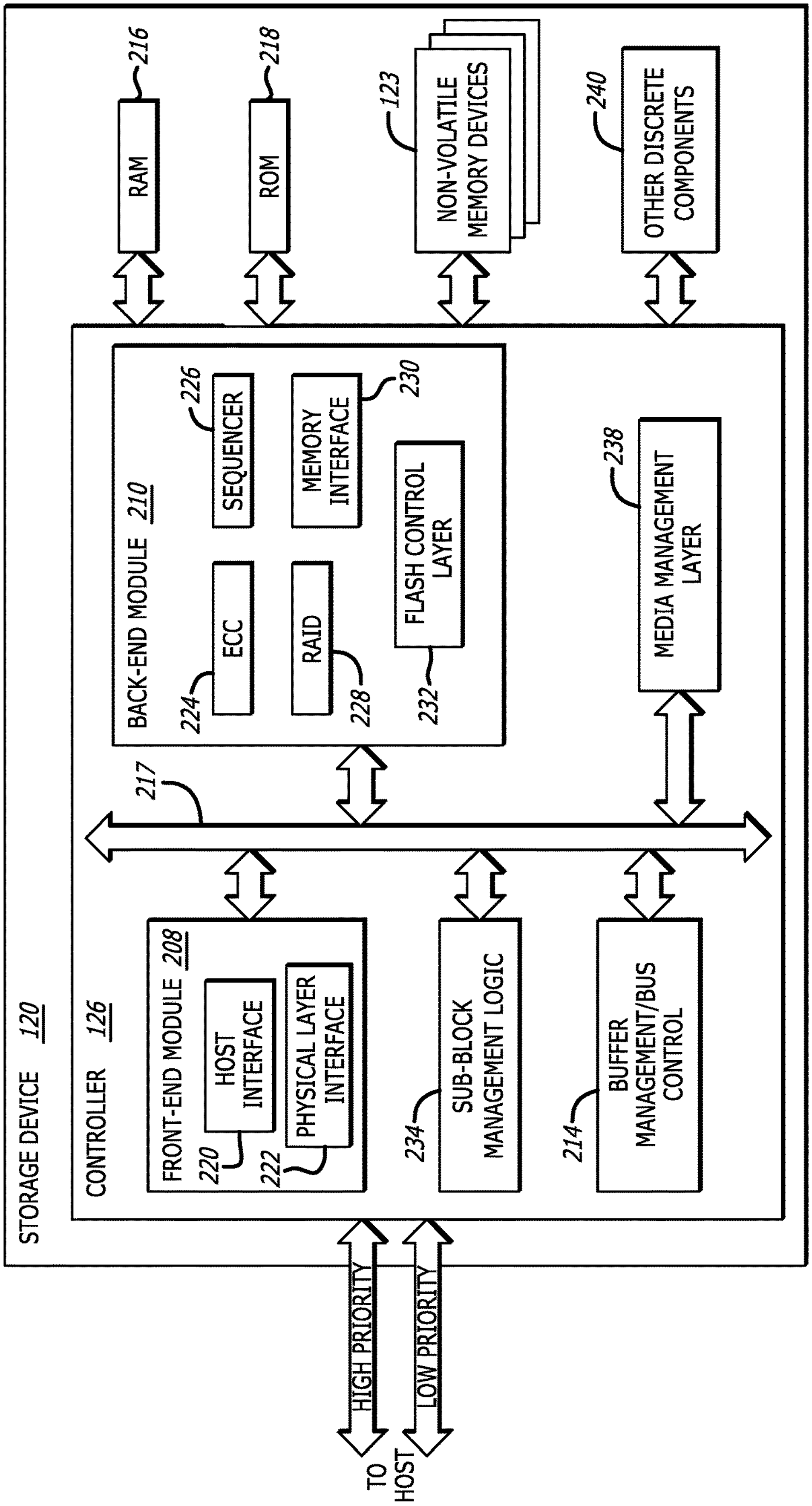
FIG. 2 is a schematic block diagram of a storage device suitable for sub-block management in accordance with an embodiment of the disclosure.

Referring to FIG. 2, a schematic block diagram of a storage device 120 suitable for sub-block management in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a sub-block management logic 234. In many embodiments, the sub-block management logic 234 can be configured to process requests to generate and manage sub-blocks within a memory array. In many embodiments, the requests may be generated by a host-computing device. In further embodiments, the requests may be internally generated by the storage device controller 126. The sub-block management logic 234 can divide one or more of the blocks within the memory array and create sub-blocks that can act independently as unique blocks.

Once generated, the sub-block management logic 234 may track the state of each sub-block as they are utilized. Blocks may be in various states during usage, such as, but not limited to, allocated, unallocated, released, unreleased, erased, etc. Each state can indicate whether the memory devices within the sub-block are currently holding valid data, holding data that can be erased, ready to have data written to it, or is already in an erased state and ready for programming. These states can change frequently during regular usage.

In additional embodiments, the sub-block management logic 234 can process a request and/or signal indicating that a particular sub-block should be erased. In response, the sub-block management logic 234 can check or poll the status of each of the related sub-blocks of the particular sub-block. If the related sub-blocks of the particular sub-block are in a state that can be erased without losing host data, the sub-block management logic 234 can direct those related sub-blocks to also be erased during the erasure of the particular sub-block, up to the entire original block to be erased. In this way, the number of overall erase procedures within the sub-block memory array can be reduced and therefore normal operation times can be reduced while increasing performance.

Figure 3:
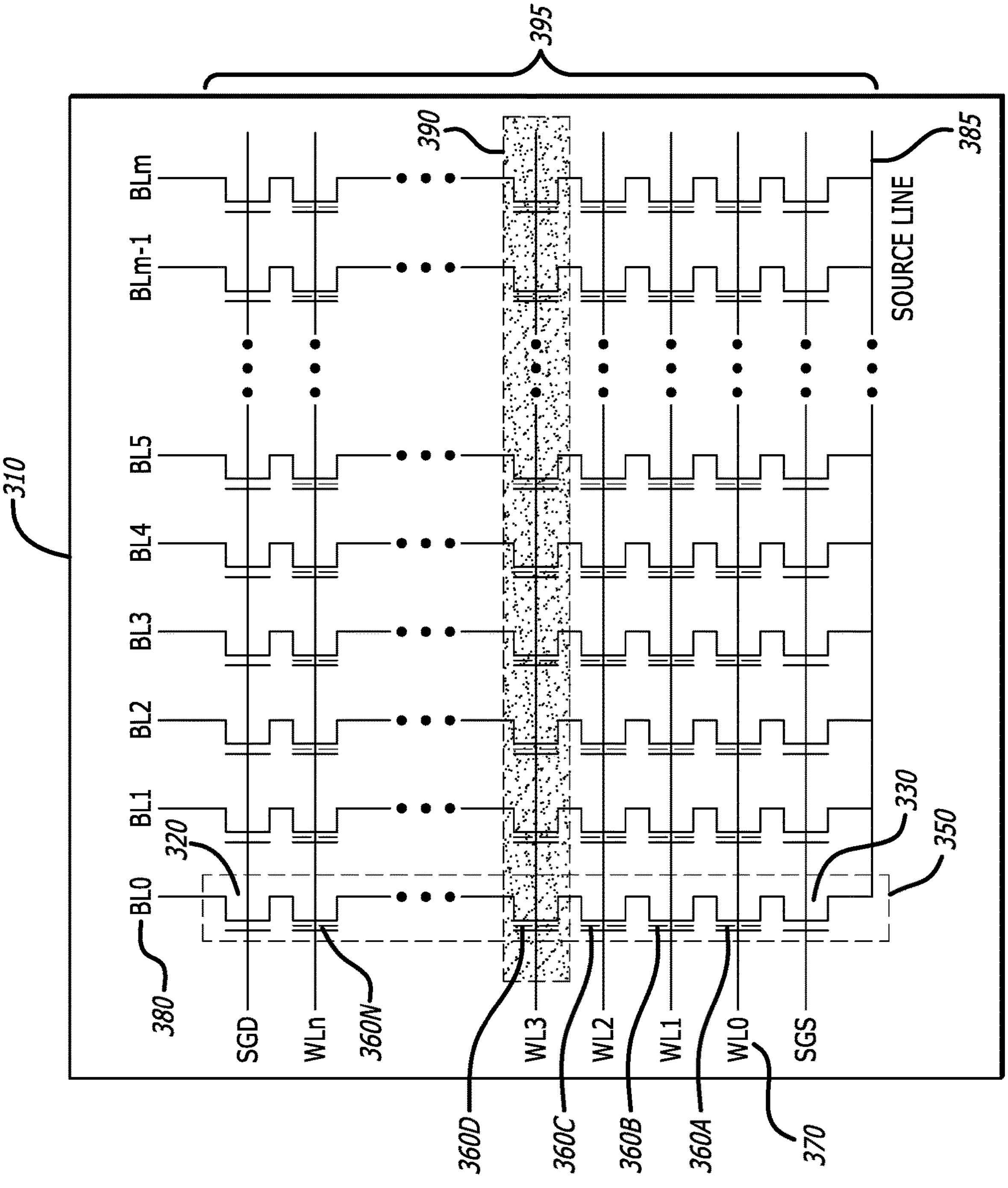
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 may comprise a plurality of memory cells 360A, 360B, 360C, 360D to 360N. Each NAND string 350 can include a select gate drain transistor (SGD) 320 and a select gate source transistor (SGS) 330. The two-dimensional memory array 310 may also include multiple pages 390. Page 390 can be configured to be accessed by the control gates of the cells of the page connected in common to a word line 370 and each cell accessible via bit lines 380. In further embodiments, the memory cells may be arranged in other configurations. The sum of these groups of pages is considered a block 395. The memory block 395 can also be further arranged and configured with other memory blocks to generate larger memory structures such as a super block, etc.

Figure 4:
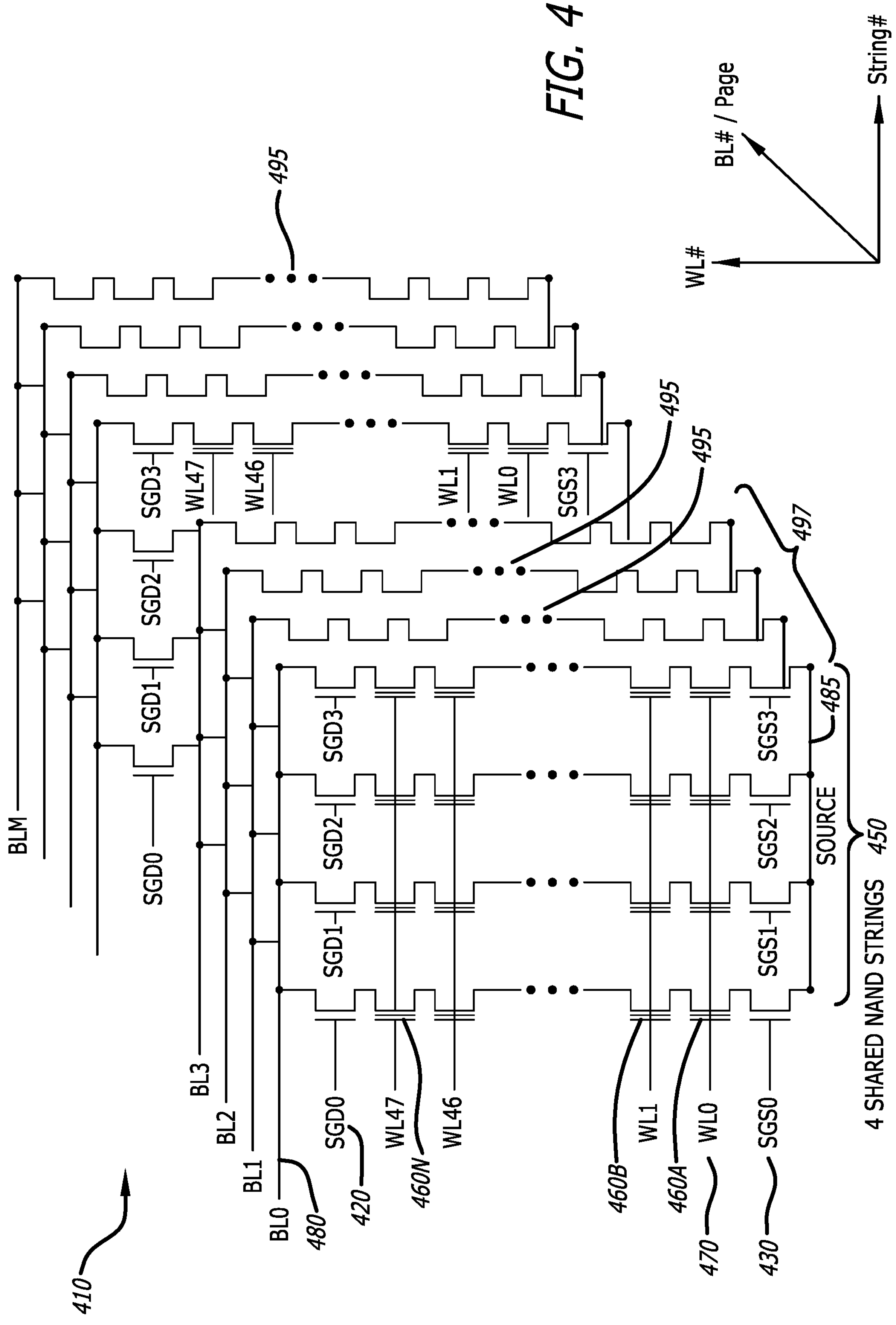
FIG. 4 is a conceptual schematic diagram of a three-dimensional memory array in accordance with an embodiment of the disclosure.

Referring to FIG. 4, a conceptual schematic diagram of a three-dimensional memory array 410 in accordance with an embodiment of the invention is shown. More specifically, FIG. 4 is a schematic diagram of one example of a three-dimensional memory array 410, such as a 3D or vertical NAND memory array or cell array. In many embodiments, a three-dimensional memory array 410 can made up of a plurality of blocks 497 which are themselves comprised of a plurality of memory blocks 495 and pages. Each block 490 may include a series of pages and a corresponding set of NAND strings 450 (four NAND strings are shown but more may be present in various embodiments). Each set of NAND strings 450 is typically connected in common to a bit line 480. Each NAND string 450 may also include a select gate drain transistor (SGD) 420, a plurality of memory cells 460A, 460B, 460N, and a select gate source transistor (SGS) 430. A row of memory cells is connected in common to a word line 470.

The memory cells 460A—460N shown within the embodiments depicted in FIGS. 3 and 4 are often comprised of a transistor that has a charge storage element to store a given amount of charge representing one or more memory states. The memory cells may be operated in a single-level cell (SLC) storing 1 bit of memory per cell, an MLC or X2 cell storing 2 bits of memory per cell, a tri-level cell (TLC) storing 3 bits of memory per cell, a quad-level cell (QLC) storing 4 bits of memory per cell, or any types of memory cell storing any number of bits per cell. The SGDs 320, 420 and SGSs 330, 430 are depicted as transistors where the voltage levels are also programmed to a certain threshold voltage level. SGDs 320, 420 connect or isolate the drain terminals of the NAND strings 350, 450 to the bit lines 380, 480. SGSs 330, 430 can connect or isolate the source terminals of the NAND strings 350, 450 to source lines 385, 485. The SGDs and SGSs can be configured to condition the word lines 370, 470 for read, program, and erase operations.

To read the data correctly from memory cells 460A—460N in a NAND configuration, threshold voltage distributions should be at their proper states within word lines, SGDs, and SGSs. Within many embodiments, the storage devices can be programmed (i.e., have data written to the memory devices) in units as small as one page 390, such as shown in FIG. 3. However, in a variety of embodiments, the data stored within the storage device can only be erased in units as small as blocks 395, 495. This often leads to a lopsided usage pattern wherein data may be written in small increments, but only erased in large increments. As a result, some memory arrays have implemented sub-block operation to allow for erasure of less than one block in size.

This disclosure is not limited to the two dimensional and three-dimensional memory arrays as described in FIG. 3 and FIG. 4 but can cover all relevant memory structures as understood by one skilled in the art. Other three-dimensional arrays are possible, such as a NAND string formed in a U-shape. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of a solid state drive.

Figure 5:
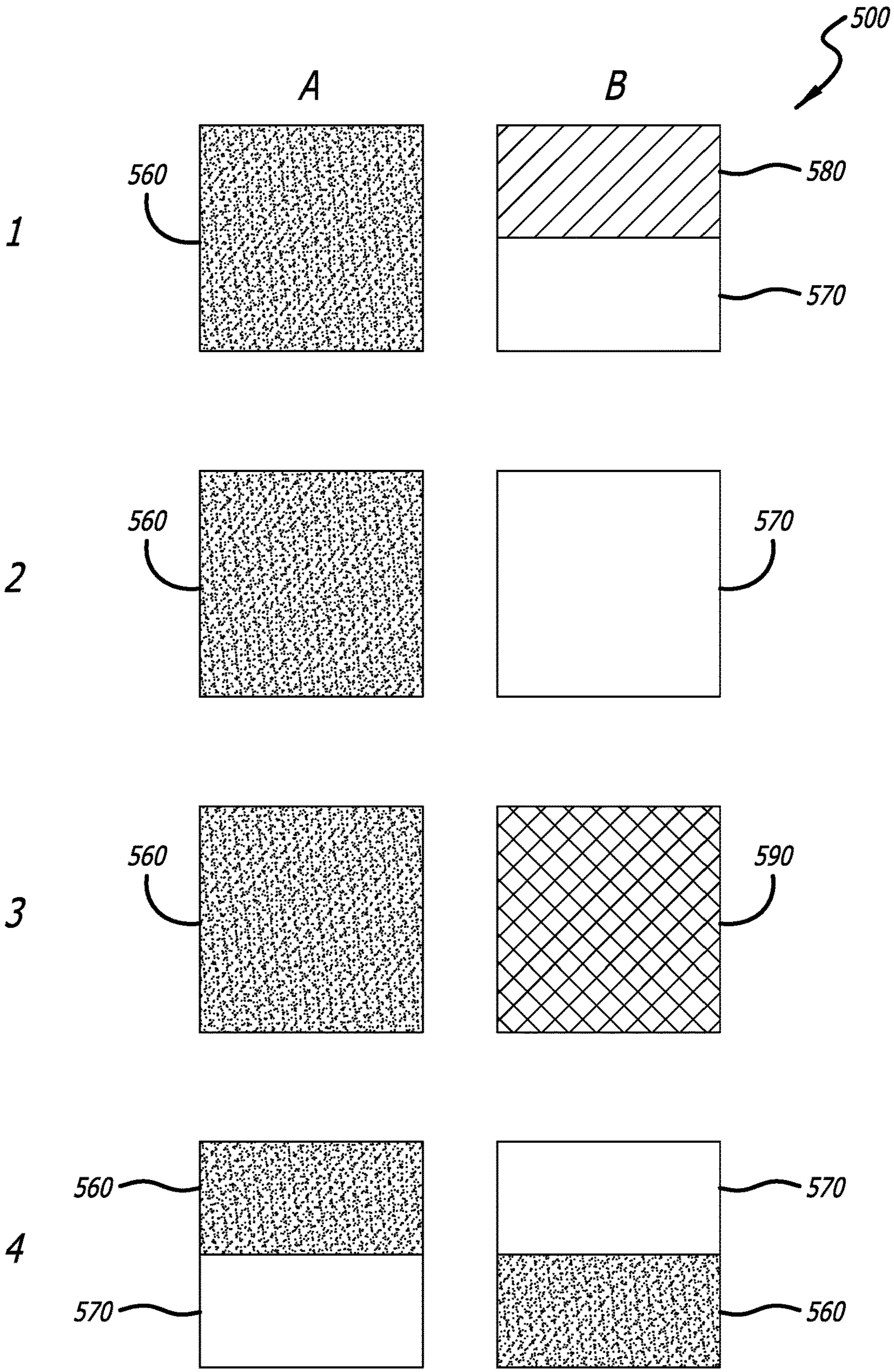
FIG. 5 is a conceptual illustration of a general pool of memory blocks being managed and configured as sub-blocks in accordance with an embodiment of the disclosure.

Referring to FIG. 5, a conceptual illustration of a general pool of memory blocks 500 being managed and configured as sub-blocks in accordance with an embodiment of the disclosure is shown. In many embodiments, the pool of memory blocks 500 can be part of a larger memory array within a storage device. Each of the pool of memory blocks 500 can be configured as either a regular block or a sub-block. In the depicted embodiment of FIG. 5, all of the blocks are dived into two sub-blocks which are each operated individually, wherein each sub-block is either in the upper or lower half of the visual depiction of the block.

The pool of memory blocks 500 can be in various states which are visually depicted by various shading. For example, blocks A1, A2, and A3 have host data written to both sub-blocks and are thus in an allocated state 560. Block A4 has a top sub-block that is in an allocated state 560 and a bottom sub-block that is in an unallocated state 570. Conversely, block B4 has a top sub-block that is in an unallocated state 570 and a bottom sub-block that is in an allocated state 560. Block B1 has a top sub-block that is in a released state 580 which indicates that it once held host data but is now ready for erasure. Finally, block B3 has both top and bottom sub-blocks that are in an erased state 590 which indicates that they have been erased and are ready to be programmed with new host data.

During operation, various blocks may be marked for erasure, or unallocated, such as the top sub-block of block B1. In many embodiments, prior to erasure of the first sub-block, the status of the second or other related sub-block(s) can be checked or polled. Often, the related sub-blocks are checked to make sure they are unallocated, released, or otherwise in a state that erasure would not negatively affect stored host data or memory device lifespans. In the case of block B1, since the bottom sub-block is in an unallocated state 570, then when an erasure command is received for the top sub-block of B1, the entire B1 block can be erased at once. Once erased, block B1 would resemble the state of block B3 which is a fully erased state 590.

While these concepts and examples are shown in a pool of memory blocks 500 that comprises eight blocks, these steps can apply to a memory array of any block size. Likewise, the depicted embodiment of FIG. 5 utilizes blocks that are divided into two sub-blocks. However, it is contemplated that blocks of any subdivision can utilize these methods, such that a block may comprise four sub-blocks or any regular division as is prudent. Additionally, while each of the block within the pool of blocks 500 is divided into sub-blocks, additional embodiments may include memory arrays where not all blocks are divided into sub-blocks. In these embodiments, the blocks may be divided into sub-blocks in response to a need for additional space, just prior to data being written to the blocks, and/or when usage patterns indicate that sub-blocks would provide more optimal operation performance.

Figure 6:
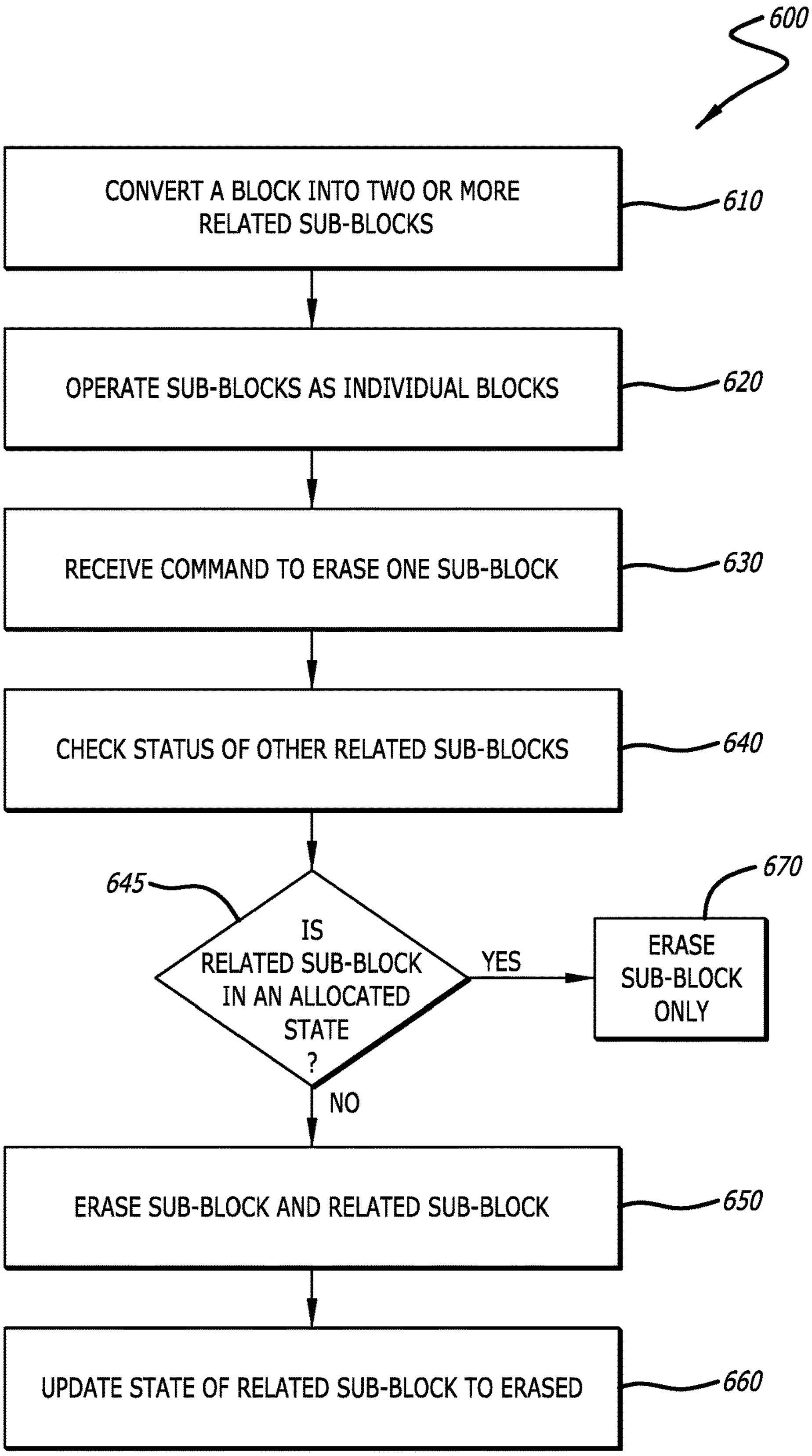
FIG. 6 is a flowchart depicting a process for efficiently erasing sub-blocks in accordance with an embodiment of the disclosure.

Referring to FIG. 6, a flowchart depicting a process 600 for partitioning and associating separate sub-blocks for a newly requested namespace in accordance with an embodiment of the disclosure is shown. In a number of embodiments, the process 600 can convert a block into two or more related sub-blocks (block 610). As previously discussed, a memory array can be configured to partition some or all blocks into sub-blocks. Each of these sub-blocks generated within each block can be considered to be related to each other as they each stem from a single original block.

Once generated, each of the related sub-blocks can be operated as regular individual blocks (block 620). The operation of these sub-blocks can be done via a controller within a storage device, but can be operated within any configurable memory array. Normal operations typically include receiving write and erase commands. These commands are often received from a host computing device in communication with a storage device housing the memory array. However, the controller of the storage device may generate these commands as well in response to internal needs such as garbage collection, wear leveling, etc.

At some the storage device controller will receive (or generate) a command to erase a particular sub-block (block 630). In many cases, these erase command can be directed to a single sub-block within a parent block. In response, many embodiments of the process 600 can check the status of other related sub-blocks (block 640). As discussed above with respect to FIG. 5, each of the sub-blocks may be in different states at various points in time. In some embodiments, the related sub-blocks may be in a state that can allow for erasure without losing host data.

The process 600 can determine if the related sub-block(s) are in an allocated state (block 645). In a number of embodiments, an allocated block can be a block that has host data stored within the memory devices within it. However, there may be other states that may be determined such as to see if the related sub-block is on a release list or otherwise has data stored within one or more memory devices but is suitable for erasure. When the related sub-block(s) are allocated, the process 600 can simply erase only the original sub-block marked for erasure. However, when the related sub-blocks are not allocated or are otherwise in a state of release, the process 600 can erase both the sub-block originally selected for erasure, and any related sub-blocks that are in a erase-ready state (block 650). Often, this process will be done over all of the related blocks within the original block. However, in certain embodiments, there may be use cases where two or more sub-blocks are erased while other related sub-blocks remain untouched during the erasure process.

Upon the completion of the erasure process, the process 600 can update the state of the related sub-block(s) to an erased status. This erased status can be any state, flag, or change that indicates that the related sub-block(s) do not require further erasure prior subsequent allocation and/or data writing. By doing this, the overall erase times within the memory array can be improved based on various data storage use cases. In alternate cases, when the process 600 determines that the related sub-blocks are not in an allocated or otherwise erasable state, the original sub-block can be erased without any other related sub-blocks (block 670).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean “one and only one” unless explicitly so stated, but rather “one or more.” All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:

a processor;

a memory array comprising:

a plurality of memory devices wherein the memory devices are configured into one or more blocks; and a sub-block management logic configured to:

configure at least one original block of the one or more blocks into sub-blocks dynamically in response to a need for additional space, just prior to data being written to the blocks, or when usage patterns indicate that sub-blocks would provide more optimal operation performance, wherein the sub-blocks generated from each block are related sub-blocks within the at least one original block;

operate the sub-blocks as individual blocks;

receive a command to erase a particular sub-block;

determine a status of all related sub-blocks of the particular sub-block, wherein the determination evaluates the related sub-blocks for an erase-ready state comprising at least an unallocated or released state of a related sub-block;

in response to the status determination, executing an erase operation on a subset of sub-blocks including both the particular sub-block, and any related sub-blocks that are in an erase-ready state, while retaining valid host data in at least one untouched related sub-block within the at least one original block, wherein the particular sub-block and any related sub-blocks are within the at least one original block; and updating a state of the erased particular sub-block and the erased related sub-blocks to an erased status, and skipping an erase step for the erased particular sub-block and the erased related sub-blocks when a subsequent command is received.

2. The device of claim 1, wherein, the sub-block management logic is further configured to update the state of the related sub-blocks to an erased status.

3. The device of claim 1, wherein each block is configured into two sub-blocks.

4. The device of claim 3, wherein each sub-block has one related sub-block.

5. The device of claim 1, wherein each block is configured into four sub-blocks.

6. The device of claim 5, wherein each block has three related sub-blocks.

7. The device of claim 1, wherein the erasing of the particular sub-block and related sub-blocks comprises erasing the entire regular block.

8. The device of claim 1, wherein the erasing is completed in one erasing action.

9. The device of claim 8, wherein the one erasing action erases the entire block comprising the particular sub-block and related sub-blocks.

10. The device of claim 1, wherein an erasing action is paused until all related sub-blocks are in an unallocated state.

11. A device comprising:

a processor;

a memory array comprising:

a plurality of memory devices wherein the memory devices are configured into one or more blocks; and a sub-block management logic configured to:

configure at least one original block of the one or more blocks into sub-blocks dynamically in response to a need for additional space, just prior to data being written to the blocks, or when usage patterns indicate that sub-bocks would provide more optimal operation performance, wherein the sub-blocks generated from each block are related sub-blocks within the at least one original block;

operate the sub-blocks as individual blocks;

determine that a particular sub-block should be released;

check the release status of all related sub-blocks of the particular sub-block;

determine status of all related sub-blocks of the particular sub-block, wherein the determination evaluates the related sub-blocks for an erase-ready state; and in response to the status determination, executing an erase operation on a subset of sub-blocks including both the particular sub-block, and any related sub-blocks that are in an erase-ready state while retaining valid host data in at least one untouched related sub-block within the at least one original block, wherein the particular sub-block and any related sub-blocks are within the at least one original block; and updating a state of the erased particular sub-block and the erased related sub-blocks to an erased status, and skipping an erase step for the erased particular sub-block and the erased related sub-blocks when a subsequent command is received.

12. The device of claim 11, wherein the erasing is completed in one erasing action.

13. The device of claim 12, wherein the one erasing action erases the entire block comprising the particular sub-block and related sub-blocks.

14. The device of claim 11, wherein the sub-block management logic is further configured to update the state of the related sub-blocks to an erased status.

15. A method erasing sub-blocks, the method comprising:

configuring at least one original block of one or more blocks dynamically in response to a need for additional space, just prior to data being written to the blocks, or when usage patterns indicate that sub-blocks would provide more optimal operation performance, within a memory array of a storage device into sub-blocks wherein the sub-blocks generated from each block are related sub-blocks within the at least one original block;

operating the sub-blocks as individual blocks within the storage device;

receiving a command to erase a particular sub-block;

determining a status of all related sub-blocks of the particular sub-block, wherein the determination evaluates the related sub-blocks for an erase-ready state;

in response to the status determination, executing an erase operation on a subset of sub-blocks including both the particular sub-block, and any related sub-blocks that are in an erase-ready state in a single erasing action while retaining valid host data in at least one untouched related sub-block within the at least one original bock, wherein the particular sub-block and any related sub-blocks are within the at least one original block; and updating a state of the erased particular sub-block and the erased related sub-blocks to an erased status, and skipping an erase step for the erased particular sub-block and the erased related sub-blocks when a subsequent command is received.

16. The method of claim 15, wherein, the sub-block management logic is further configured to update the state of the related sub-blocks to an erased status.

17. The method of claim 15, wherein the release status of all related sub-blocks of the particular sub-block is checked.

18. The method of claim 17, wherein the method determines if all related sub-blocks are released prior to erasing.

19. The method of claim 15, wherein the erasing is completed in one erasing action.

20. The method of claim 19, wherein the one erasing action erases the entire block comprising the particular sub-block and related sub-blocks.

* * * * *